(12) United States Patent
Lee et al.

(10) Patent No.: US 8,640,471 B2
(45) Date of Patent: Feb. 4, 2014

(54) CONTROL METHOD FOR REFRIGERATOR

(75) Inventors: Namgyo Lee, Seoul (KR); Deokhyun Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 310 days.

(21) Appl. No.: 13/159,803

(22) Filed: Jun. 14, 2011

(65) Prior Publication Data

US 2011/0302938 A1 Dec. 15, 2011

(30) Foreign Application Priority Data

Jun. 14, 2010 (KR) .................. 10-2010-0055894
Jun. 14, 2010 (KR) .................. 10-2010-0055896

(51) Int. Cl.
*F25D 17/06* (2006.01)

(52) U.S. Cl.
USPC ............................................. 62/89

(58) Field of Classification Search
USPC ........... 62/157, 178, 179, 180, 199, 200, 231, 62/441, 89
See application file for complete search history.

(56) References Cited

U.S. PATENT DOCUMENTS

| 5,918,474 | A * | 7/1999 | Khanpara et al. ............... 62/179 |
| 6,679,073 | B1 * | 1/2004 | Hu .................... 62/135 |
| 2007/0227166 | A1 * | 10/2007 | Rafalovich et al. ............. 62/199 |
| 2009/0164048 | A1 * | 6/2009 | Kyuma ......................... 700/275 |

* cited by examiner

*Primary Examiner* — Melvin Jones
(74) *Attorney, Agent, or Firm* — Fish & Richardson P.C.

(57) ABSTRACT

The present invention provides a control method for a refrigerator that can acquire a pump-down effect without performing an additional pump-down process and furthermore, efficiently utilize residual cool air remaining in a freezer evaporator.

22 Claims, 9 Drawing Sheets

(a)

(b)

(a)

(b)

CONTROL METHOD FOR REFRIGERATOR

CROSS REFERENCES RELATED APPLICATIONS

The present application claims the benefits of priority to Korean Patent Applications No. 10-2010-0055894 (filed on Jun. 14, 2010) and 10-2010-0055896 (filed on Jun. 14, 2010), which are herein incorporated by reference in its entirety.

THE BACKGROUND

1. The field

The present invention relates a control method for a refrigerator.

2. Description of the Related Art

In a refrigerator having a cooling cycle in which refrigerants discharged from a compressor dividually flow to a freezer evaporator and a fridge evaporator through a 3-way valve, when the cooling cycle is reactivated while the compressor stops, refrigerants passages of the freezer evaporator and the fridge evaporator are closed and pump-down to operate the compressor is performed. By this configuration, the refrigerants in the freezer evaporator which are relatively in a low pressure are collected and the refrigerants are sent to the fridge evaporator.

Specifically, in general, in the case of a refrigerator in which the freezer evaporator and the fridge evaporator are provided in parallel, chambers are cooled in the sequence of cooling of the fridge, cooling of the freezer, and stopping of the compressor. Herein, when the refrigerants are sent to the freezer evaporator in order to cool the freezer, the pressure of the fridge evaporator is relatively high, such that refrigerants remaining the fridge evaporator are naturally collected by a pressure difference during cooling the freezer. That is, the refrigerants in the fridge evaporator get together with refrigerants of an outlet of the freezer evaporator to flow to an expansion device. However, when the refrigerants are sent to the fridge evaporator in order to cool the fridge, since the pressure of the freezer evaporator is lower than that of the fridge evaporator, the refrigerants cannot be smoothly collected and the refrigerants of the fridge evaporator may rather flow backward to the freezer evaporator.

Furthermore, at the time when the compressor stops, most refrigerants remain in the freezer evaporator. Therefore, when the compressor is reactivated to cool the fridge, it is difficult to collect the refrigerants of the freezer evaporator. For this reason, before the compressor stops, pump-down to collect the refrigerants of the freezer evaporator and gather the collected refrigerants in a condenser is performed. That is, a process of sending all the refrigerants gathered in the freezer evaporator and the fridge evaporator by closing both inlets of the freezer evaporator and the fridge evaporator and actuating the compressor is performed.

In the case of a refrigerator having such a system, the pressure of the outlet of the evaporator rapidly decreases to decrease to a vacuum level during the pump-down. In addition, the temperature of the evaporator rapidly decreases to a low temperature due to a sudden decrease in pressure and the resulting evaporation of the refrigerants. As a result, extremely low temperature refrigerants enter the compressor to decrease the temperature of the compressor and cause liquid compression, thereby deteriorating reliability of the compressor.

THE SUMMARY

The present invention has been made in an effort to provide a control method for a refrigerator capable of acquiring a pump-down effect without performing an additional pump-down process and furthermore, efficiently utilizing residual cool air remaining in an evaporator of a freezer.

An exemplary embodiment of the present invention provides a control method for a refrigerator including a compressor, a fridge evaporator and a freezer evaporator connected in parallel to an outlet of the compressor, and a valve member selectively opening and closing a refrigerant passage to allow refrigerants to flow to any one side of the fridge evaporator and the freezer evaporator, the method comprising: actuating the compressor; opening a refrigerant passage at the fridge evaporator by operating the valve member at the same time when or just after the compressor is actuated; actuating a freezer fan at the same time when or just after the refrigerant passage at the fridge evaporator is opened; and actuating the fridge fan at a predetermined time earlier than an opening time of the refrigerant passage at the fridge evaporator.

Another exemplary embodiment of the present invention provides a control method for a refrigerator including a compressor, a fridge evaporator and a freezer evaporator connected in parallel to an outlet of the compressor, an ice-making chamber making ice, and a valve member selectively opening and closing a refrigerant passage to allow refrigerants to flow to any one side of the fridge evaporator and the freezer evaporator, the method comprising: actuating the compressor; opening a refrigerant passage at the fridge evaporator by operating the valve member at the same time when or just after the compressor is actuated; actuating an ice-making chamber fan at the same time when or just after the refrigerant passage at the fridge evaporator is opened; and actuating the fridge fan at a predetermined time earlier than an opening time of the refrigerant passage at the fridge evaporator.

The control method for a refrigerator according to the exemplary embodiments of the present invention configured as above provides the following effects.

In a refrigerator to which a cooling cycle having evaporators connected in parallel is applied, since a pump-down operation performed in spite of deterioration of reliability and efficiency of a compressor can be omitted, efficiency of the cooling cycle is improved and power consumption is saved. That is, even though the existing pump-down process is omitted, refrigerants of a freezer evaporator are rapidly collected.

Further, as the existing pump-down process is omitted, a liquid compression phenomenon in which a liquid refrigerant is introduced into the compressor is removed, and as a result, the reliability of the compressor is improved.

Even though the existing pump-down process is omitted, the refrigerants can be effectively collected, and as a result, efficiency of the cooling cycle for cooling a fridge is improved.

Since a freezer can be cooled by utilizing residual cool air (evaporation latent heat) of the freezer evaporator, cooling efficiency is improved and the power consumption is reduced. Specifically, even when the compressor stops and a flow of the refrigerants stops, the freezer fan is actuated for a predetermined time, such that an evaporation pressure of the freezer evaporator increases. Therefore, a difference between the evaporation pressure of the freezer evaporator and an evaporation pressure of the fridge evaporator decreases, and as a result, a refrigerant collection time is shortened in the subsequent cooling cycle.

Furthermore, the freezer fan is actuated for a predetermined time even after the compressor stops, such that the residual cool air of the freezer evaporator which is wasted in the related art is supplied to the freezer to further lower the temperature of the freezer, thereby improving energy efficiency.

Further, the fridge fan is actuated when a set time elapsed after the compressor starts to be actuated in order to actuate a fridge cooling cycle, such that the evaporation pressure of the fridge evaporator decreases. Therefore, the difference between the evaporation pressure of the fridge evaporator and the evaporation pressure of the freezer evaporator decreases, and as a result, the refrigerants can be rapidly collected simultaneously during the fridge cooling process. That is, the additional pump-down process is not required.

THE DETAILED DESCRIPTION

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Hereinafter, a control method for a refrigerator according to an exemplary embodiment of the present invention will be described in detail with reference to the accompanying drawings.

The spirit of the present invention is hereinafter applied to a bottom freezer type refrigerator in which a fridge is formed above a freezer, but not limited thereto. That is, the spirit of the present invention is applied to even a top mount type refrigerator in which the freezer is formed above the fridge as well as a side-by-side type refrigerator in which the fridge and the freezer are, in parallel, installed at both sides.

Further, the spirit of the present invention is applied to even a refrigerator in which an ice-making chamber is provided in the freezer as well as a refrigerator in which an ice-making chamber is provided in the fridge.

Figure 1:
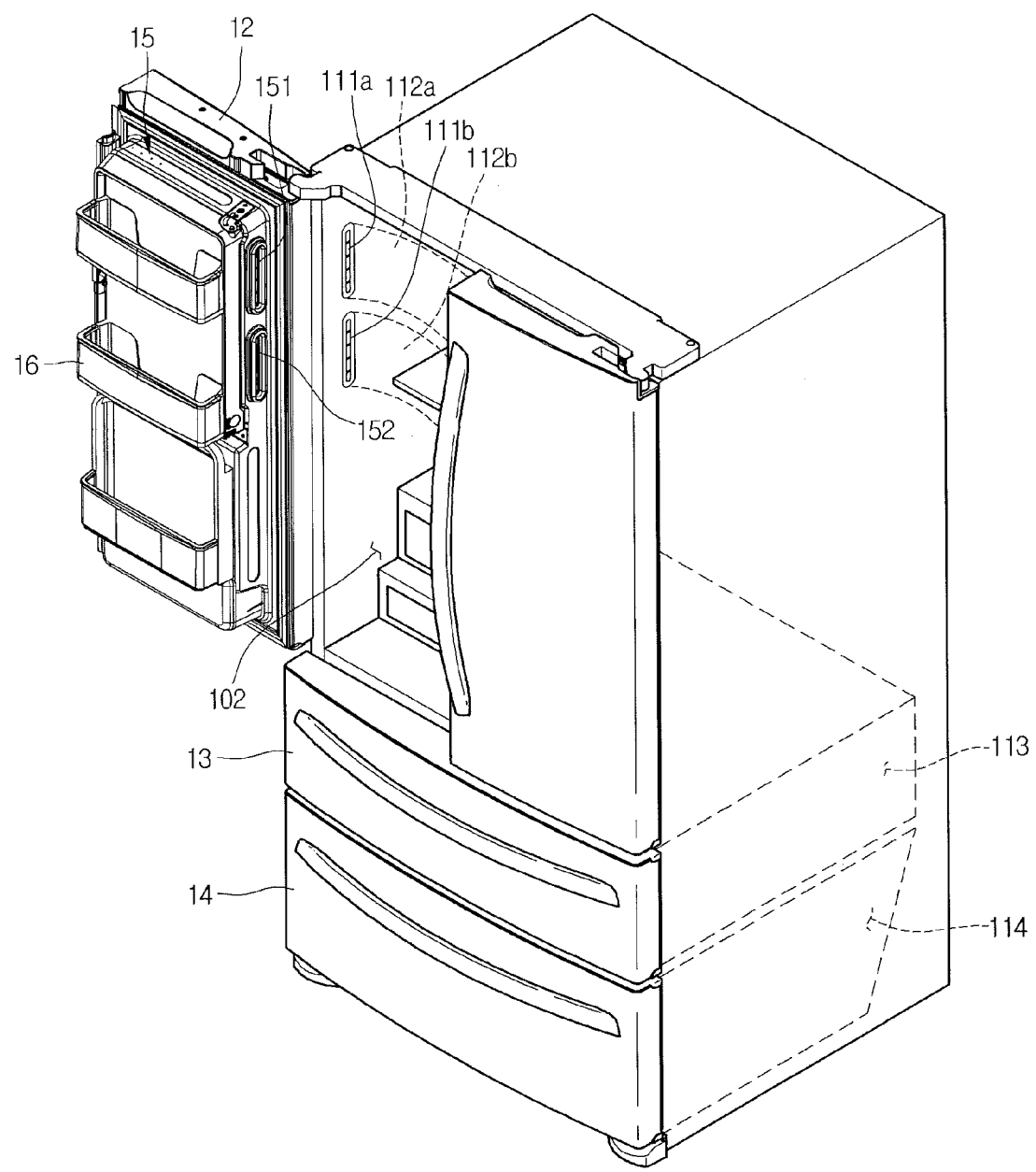
FIG. 1 is a perspective view illustrating a refrigerator according to an exemplary embodiment of the present invention.

FIG. 1 is a perspective view illustrating a refrigerator according to an exemplary embodiment of the present invention.

Figure 2:
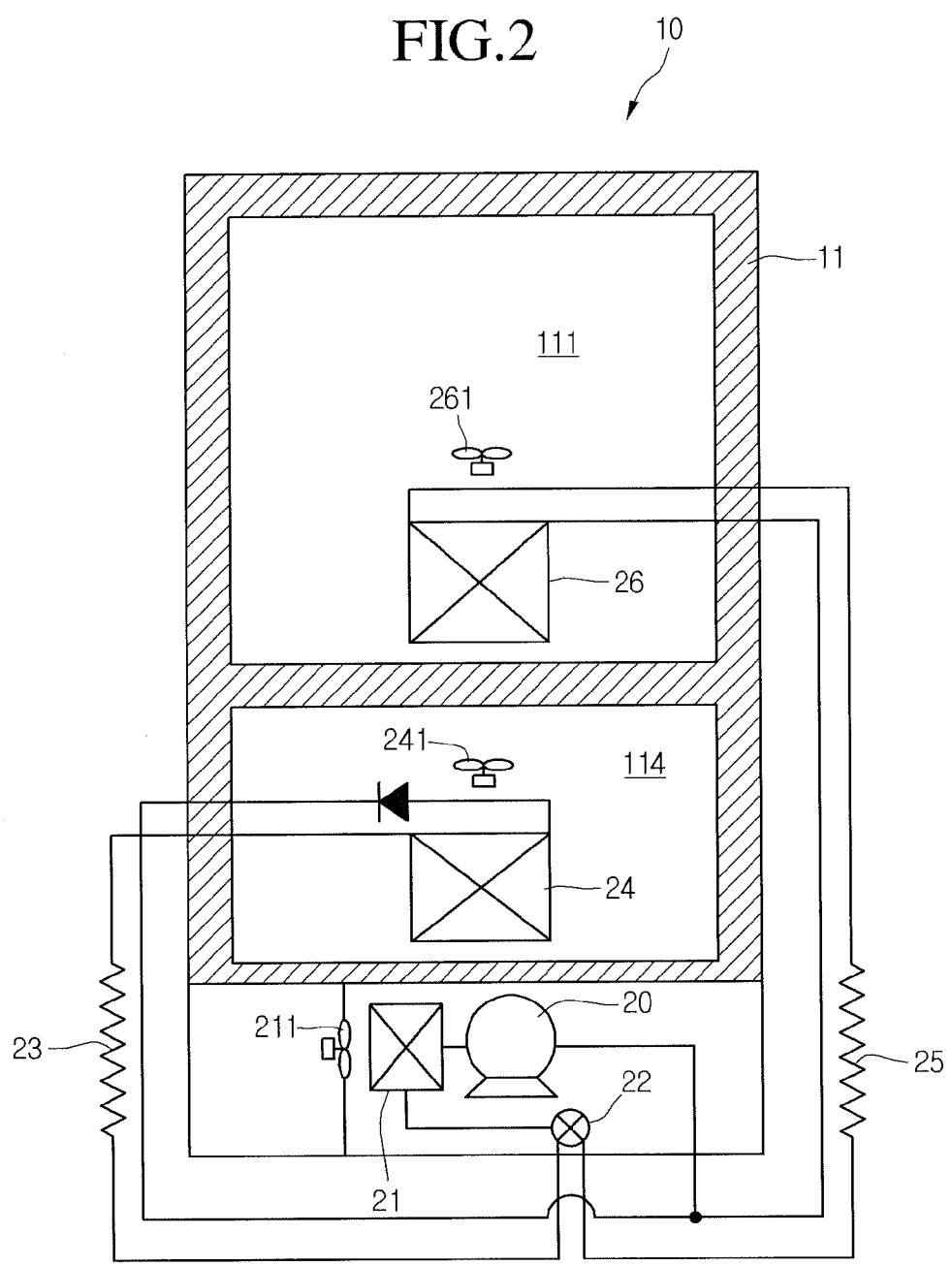
FIG. 2 is a diagram illustrating a cooling cycle provided to a refrigerator according to an exemplary embodiment of the present invention.

Referring to FIGS. 1 and 2, the refrigerator 10 according to the exemplary embodiment of the present invention includes a body 11 having a storage chamber formed therein and a door opening the storage chamber.

Specifically, the storage chamber includes a fridge 111 in which an internal temperature is higher than a freezing temperature, a freezer 114 in which an internal temperature is lower than the freezing temperature, and a switching chamber 113 in which any one of the temperature of the fridge and the temperature of the freezer is selectable to be maintained. A space for the switching chamber 113 may be provided or not provided depending on products.

More specifically, the fridge 111 is selectively opened and closed by the fridge door 12 and an ice-making chamber 15 may be provided on the rear surface of the fridge door 12. The ice-making chamber 15 may be provided on the rear surface of the fridge door 12 as shown in the figure or may be provided in the fridge 111. Alternatively, the ice-making chamber 15 may be provided in the freezer 114.

Further, one or more door baskets 16 may be mounted on the rear surface of the fridge door 12 and a plurality of racks and drawable type storage boxes may be provided in the fridge. In addition, the switching chamber 113 and the freezer 114 may be selectively opened and closed by a switching chamber door 13 and a freezer door 14. In addition, the switching chamber door 13 and the freezer door 14 may be drawer type doors that slidably move in forward and backward directions in an upright state. That is, the storage box is mounted on each of the rear surfaces of the switching chamber door 13 and the freezer door 14, and the door and the storage box may move integrally. In addition, spaces in which the switching chamber and the freezer are provided form a single freezer, which may be opened and closed by a single freezer door.

Further, in the exemplary embodiment, since the ice-making chamber 15 is provided in the fridge door 12, a cool air passage for supplying cool air generated from an evaporator to the ice-making chamber 15 may be formed in the body 11. That is, in the body 11 may be formed a cool air supplying passage 112a for supplying the cool air to the ice-making chamber 15 and a cool air returning passage 112b for returning the cool air discharged from the ice-making chamber 15 to the evaporator. In addition, a cool air supplying hole 111a and a cool air returning hole 111b may be formed at end portions of the cool air supplying passage 112a and the cool air returning passage 112b, respectively. Further, a cool air providing hole 151 and a cool air discharging hole 152 that are in communication with the cool air supplying hole 111a and the cool air returning hole 111b, respectively may be formed on one surface of the ice-making chamber 15. In addition, a ice-making chamber fan (not shown) may be mounted in the ice-making chamber or at an inlet end of the cool air supplying passage 112a.

FIG. 2 is a diagram illustrating a cooling cycle provided to a refrigerator according to an exemplary embodiment of the present invention.

Referring to FIG. 2, the cooling cycle of the refrigerator 10 according to the exemplary embodiment of the present invention includes a compressor 20, a condenser 21 connected to an outlet of the compressor 20, a valve 22 connected to an outlet of the condenser 21, a freezer expansion valve 23 and a fridge expansion valve 25 each connected to refrigerant pipes branched from an outlet of the valve 22, and a freezer evaporator 24 connected to an outlet of the freezer expansion valve 23 and a fridge evaporator 26 connected to an outlet of the fridge expansion valve 25.

Specifically, as shown in the figure, the valve 22 may be a 3-way valve that allows refrigerants discharged from the condenser 21 to selectively flow to any one of the freezer evaporator 24 or the fridge evaporator 25. As another method, two pipes are branched at a predetermined portion of the outlet of the condenser 21 and a freezer valve and a fridge valve may be mounted at inlets of the two pipes, respectively. Hereinafter, it should be analyzed that "opening of the freezer valve or the fridge valve" includes both a first case in which the refrigerants selectively flow to the freezer evaporator or the fridge evaporator by operating the 3-way valve and a second case in which any one of the freezer valve and the fridge valve is opened.

Meanwhile, pipes extended from outlets of the freezer evaporator 24 and the fridge evaporator 26 get together as one pipe and connected to an inlet of the compressor 20. In addition, a condensing fan 211, a freezer fan 241, and a fridge fan 261 are mounted around the condenser 21, the freezer evaporator 24, and the fridge evaporator 26, respectively. Further, the freezer evaporator 24 may be mounted in the rear surface of the body 11 corresponding to the rear surface of the freezer and the fridge evaporator 24 may be mounted in the rear surface of the body 11 corresponding to the rear surface of the fridge. Each of a via-hole that is in communication with the freezer and a via-hole that is in communication with an inlet of the cool air supplying passage 112a may be formed at one side of an evaporation chamber housing the freezer evaporator 24. The ice-making chamber fan may be mounted in the via-hole that is in communication with the cool air supplying passage 112a.

The control method of the refrigerator configured as above starts when the temperatures of the fridge 111 and the freezer 114 reach set temperatures and thus, the compressor 20 stops.

Figure 3:
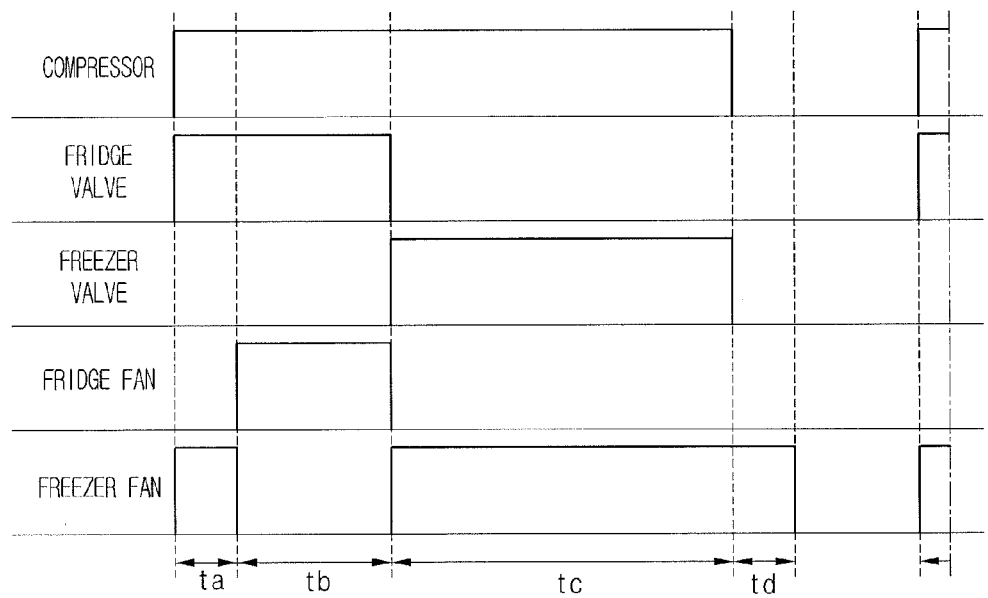
FIG. 3 is a diagram expressing a control method for a refrigerator according to an exemplary embodiment of the present invention by an operation time and operation hours of components constituting a cooling cycle.

FIG. 3 is a diagram expressing a control method for a refrigerator according to an exemplary embodiment of the present invention by an operation time and operation hours of components constituting a cooling cycle.

Referring to FIG. 3, when it is judged that the temperature of the fridge 111 is equal to or higher than the set temperature and thus, cooling is required, the compressor 20 is actuated and at the same time, the fridge valve is opened, and the freezer fan 241 is actuated. Herein, the fridge fan 261 is not actuated even though the fridge valve is opened in order to rapidly lower an evaporation temperature and an evaporation pressure of the fridge evaporator 26 by delaying an actuation time of the fridge fan 261. In addition, the freezer fan 241 is actuated in a fridge cooling mode in order to freeze the freezer 114 by sending residual cool air remaining in the freezer evaporator 24 to the freezer 114 and make an evaporation temperature and an evaporation pressure of the freezer evaporator 24 be maximally close to the evaporation temperature and pressure of the fridge evaporator 26 by raising the evaporation temperature and pressure of the freezer evaporator 24. Therefore, during a fridge cooling process in which the refrigerants flow to the fridge evaporator 26, a time required to collect the refrigerants remaining in the freezer evaporator 24 is shortened and the refrigerants can be easily collected without an additional pump-down process.

Meanwhile, the freezer fan 241 is actuated only for a set time ta and thereafter, stops. If the freezer fan 241 is continuously actuated, the temperature of the cool air supplied from the evaporator is rather higher than the temperature of the freezer, thereby causing an adverse effect to increase a chamber load of the freezer. Herein, a time when the freezer fan 241 is actuated in the fridge cooling mode may be a predetermined value determined through various tests and may be inputted as a predetermined time value into a control program. Alternatively, the operation time ta of the freezer fan 241 may be a time value varying depending on a fridge valve opening time of the previous cycle. For example, ½ or ⅓ of the fridge valve opening time of the previous cycle is programmed to be determined as the operation time ta of the freezer fan 241. As such, an actuation time may vary in accordance with an operation state or an operation condition.

Meanwhile, at the time when the freezer fan 241 is actuated only for the set time ta and thereafter, stops, the fridge fan 261 starts to be actuated. That is, by making an actuation time of the fridge fan 261 be later than an opening time of the fridge valve, the evaporation pressure of the fridge evaporator is maximally lowered. However, the actuation time of the fridge fan 261 may be a predetermined time when the freezer fan 241 is being actuated or a predetermined time when a predetermined time elapsed after the freezer fan 241 stops.

In addition, when the temperature of the fridge 111 is lowered to the set temperature, the fridge valve is closed and at the same time, the freezer valve is opened to start cooling the freezer. Further, at the same time when or just after the freezer valve is opened, the freezer fan 241 is reactuated. The compressor 20 is continuously actuated until the temperature of the freezer 114 is lowered to the set temperature. In addition, when the temperature of the freezer 114 reaches the set temperature, the freezer valve is closed and the compressor 20 stops. Herein, even though the compressor 20 stops and the freezer valve is closed, the freezer fan 241 is further actuated for a set time td and thereafter, stops. Therefore, during a freezer cooling process, the actuation time of the freezer fan 241 is a time acquired by adding the set time td to a freezer valve opening time tc.

This is to improve cooling efficiency through maximally lowering the temperature of the freezer by supplying the residual cool air remaining in the freezer evaporator 24 to the freezer without extinction. In particular, since the freezer 114 is relatively lower than the fridge in risk of damage to foods due to undercooling even though the temperature of the freezer is lower than the set temperature, latent heat of evaporation remaining in the freezer evaporator 24 needs to be maximally supplied to the freezer. By this configuration, a time required to raise the temperature of the freezer 114 increases, and as a result, power consumption for operating the cooling cycle can be reduced.

Of course, the extended operation time td of the freezer fan 241 may also be a predetermined constant value determined by the tests. Alternatively, the time td may be a time value acquired from a function using as variables the temperature of the cool air introduced into the freezer evaporator 24, the temperature of the refrigerants remaining the freezer evaporator 24, and an air volume or a wind velocity caused by the fan. For example, when the temperature of the cool air introduced into the freezer evaporator, the temperature of the refrigerants remaining in the freezer evaporator, an air volume or wind velocity value caused by the fan while the compressor stops are inputted into the function, a time when the temperature of the residual cool air of the freezer evaporator 24 is higher than the chamber temperature of the freezer is acquired to determine the extended operation time of the freezer fan 241.

Figure 4:
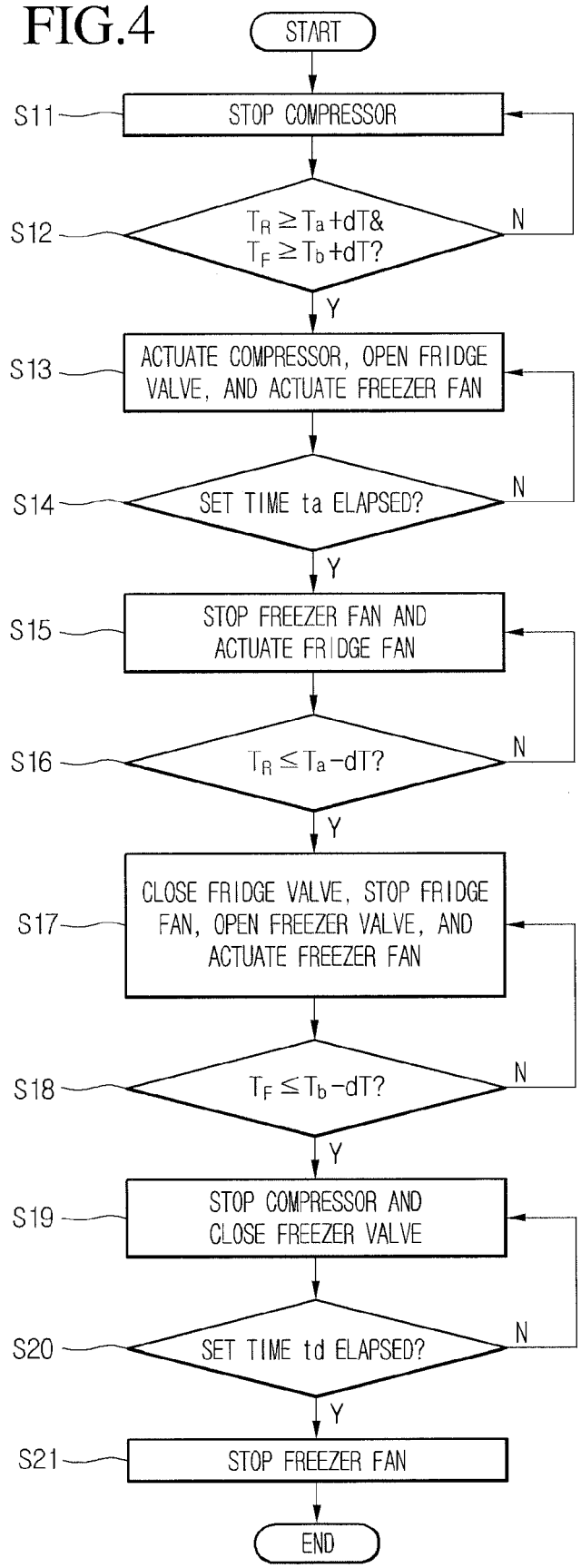
FIG. 4 is a flowchart illustrating a control method for a refrigerator according to an exemplary embodiment of the present invention.

FIG. 4 is a flowchart illustrating a control method for a refrigerator according to an exemplary embodiment of the present invention.

Referring to FIG. 4, this flowchart is to illustrate a content which the drawing shown in FIG. 3 means in a time series.

As set forth above in FIG. 3, the control method according to the exemplary embodiment of the present invention is limited to starting while the compressor 20 stops for convenience of description (S11).

Specifically, after the compressor 20 stops, when it is judged that the temperature $T_R$ of the fridge is equal to or higher than a set upperlimit temperature $T_a$+dT and the temperature $T_F$ of the freezer is also equal to or higher than a set upperlimit temperature $T_b$+dT (S12), the fridge cooling process is first performed. That is, the compressor starts to be actuated and the fridge valve is opened, and the freezer fan 241 is actuated for a set time ta (S13). Herein, since the reason why the freezer fan 241 is actuated for a mean while during the fridge cooling process has been described above, a description thereof will be omitted. In addition, as the actuation condition of the compressor 20, both the temperatures of the fridge and the freezer do not particularly need to increase to the set upperlimit temperatures or higher. That is, even when only any one of the temperature of the fridge and the temperature of the freezer increases to the set upperlimit temperature or higher, the compressor may be programmed to be actuated.

Meanwhile, when the freezer fan 241 starts to be actuated and the set time ta elapsed (S14), the freezer fan 241 stops to be actuated and at the same time, the fridge fan 261 starts to be actuated (S15). As described above, of course, an actuation time of the fridge fan 261 may be set differently from the exemplary embodiment. In addition, the fridge fan 261 is actuated to supply the cool air to the fridge 111, thereby lowering the temperature of the fridge. When it is judged that the temperature $T_R$ of the fridge 111 reaches a set temperature $T_a$−dT (S16), the fridge valve is closed and the fridge fan stops to be actuated and the freezer valve is opened and the freezer fan 241 is actuated (S17). That is, the freezer cooling process starts.

Further, when the freezer fan 241 is actuated to supply the cool air to the freezer 114, the temperature of the freezer 114 is lowered. In addition, when the temperature $T_F$ of the freezer 114 reaches a set temperature Tb−dT (S18), the compressor 20 stops and the freezer valve is closed (S19). In this case, even though the compressor 20 stops, the freezer fan 241 is extensively actuated. When it is judged that an extensive actuation time of the freezer fan 241 elapses the set time td (S20), the freezer fan 241 stops to be actuated (S21).

Figure 5:
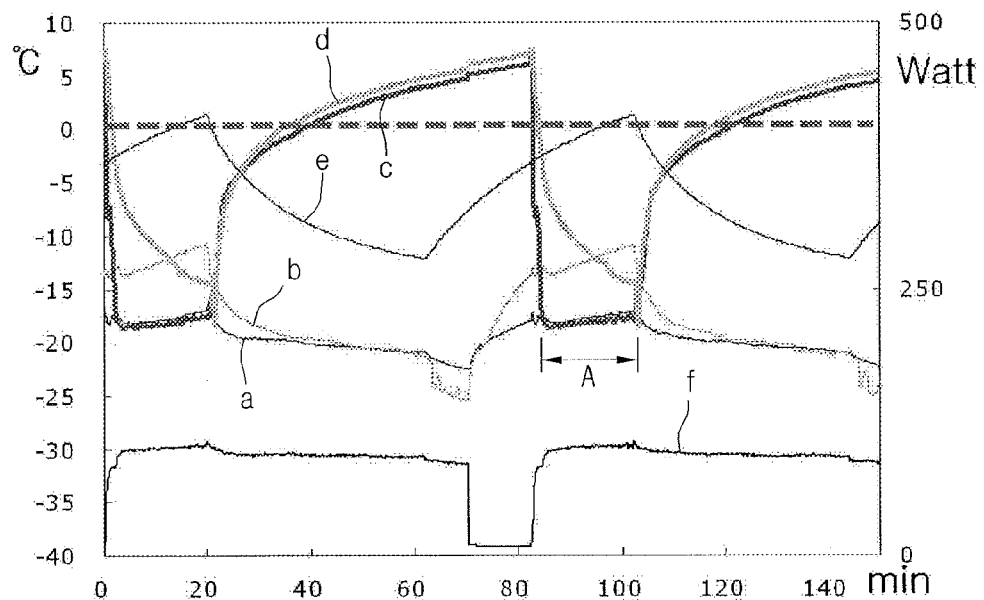
FIG. 5 is a graph illustrating a comparison in a refrigerant state between a case in which a pump-down process is merely omitted and a case in which the control method according to the exemplary embodiment of the present invention is applied.
Figure 5:
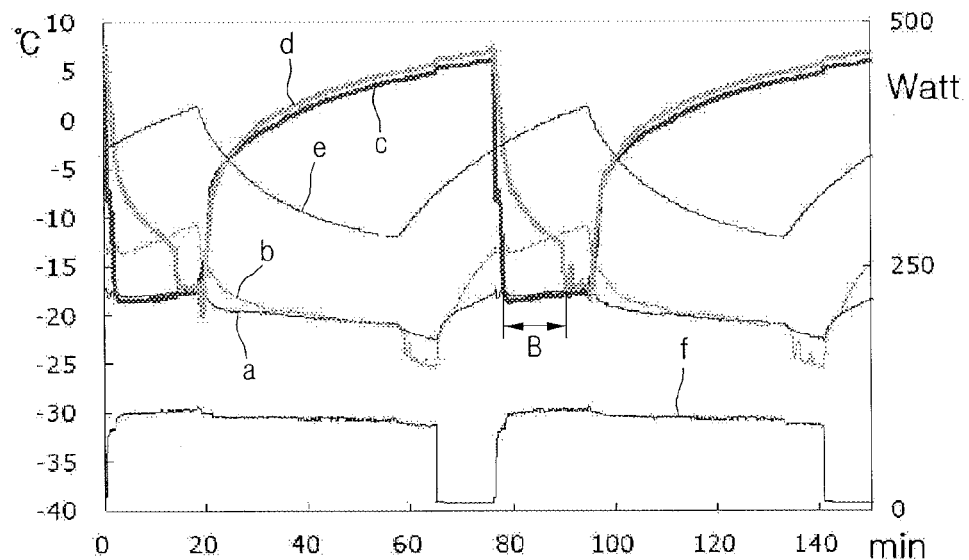

FIG. 5 is a graph illustrating a comparison in a refrigerant state between a case in which a pump-down process is merely omitted and a case in which the control method according to the exemplary embodiment of the present invention is applied.

Referring to FIG. 5, in the graph, a is a graph illustrating variation in temperature at the inlet of the freezer evaporator, b is a graph illustrating variation in temperature of the outlet of the freezer evaporator, c is a graph illustrating variation in temperature of the inlet of the fridge evaporator, d is a graph illustrating a temperature of the outlet of the fridge evaporator, e is a graph illustrating variation in temperature of the ice-making chamber, and f is a graph illustrating variation in input power of the compressor.

Further, the graph (a) of FIG. 5 illustrates a characteristic when the pump-down process is just removed from the existing cooling cycle and the graph (b) illustrates a characteristic when the control method according to the exemplary embodiment of the present invention is applied.

In the graphs (a) and (b), at an initial point when the compressor 20 starts to be actuated and the fridge cooling cycle starts, collection of the refrigerants starts and a point when an inlet temperature and an outlet temperature of the fridge evaporator are the same as each other is set as a collection termination time of the refrigerants. Period A and period B in the graph represent a refrigerant collection time in the known case to perform the pump-down and a refrigerant collection time in a case to perform the control method according to the exemplary embodiment of the present invention, respectively. By the control method according to the exemplary embodiment of the present invention, the refrigerant collection time may be shortened (B<A) compared with the case in which the pump-down is removed through the two graphs.

Accordingly, by the control method, an additional pump-down process for collecting the refrigerants becomes unnecessary, and as a result, the power consumption is reduced and the evaporation latent heat remaining the freezer evaporator 24 can be effectively used. Further, the refrigerant collection time is shortened compared with the case in which the pump-down process is just omitted.

Figure 6:
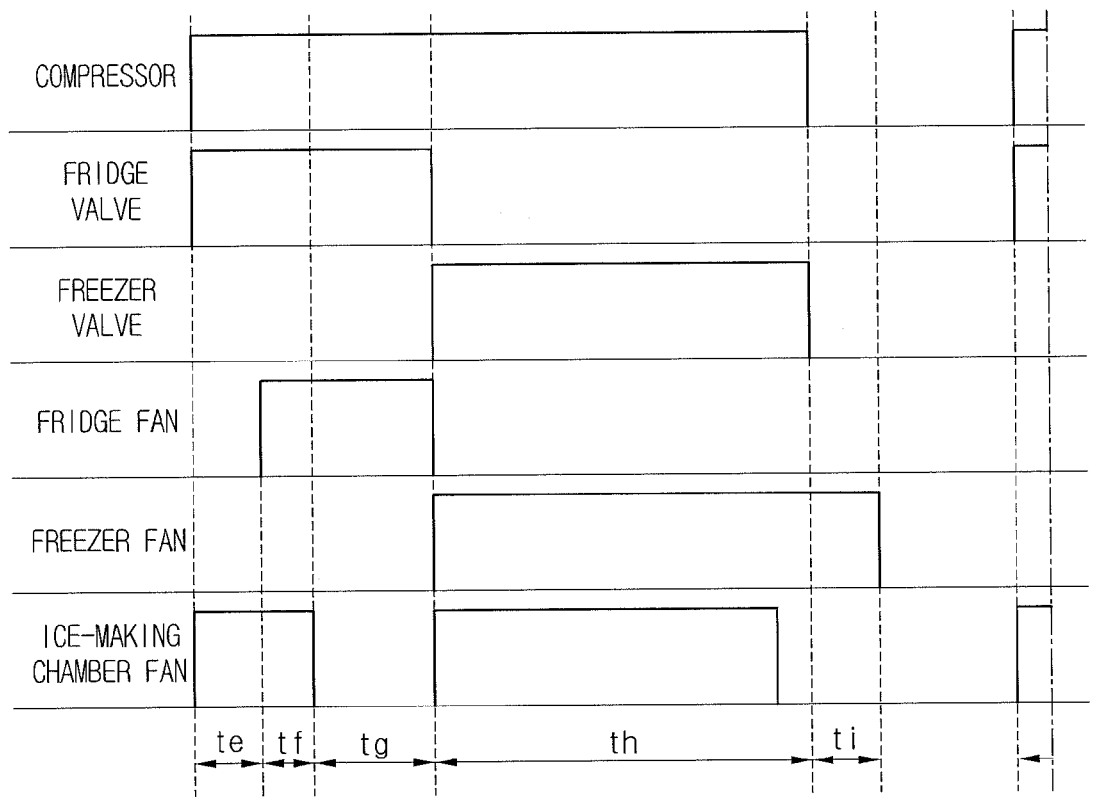
FIG. 6 is a diagram expressing a control method for a refrigerator according to an exemplary embodiment of the present invention by an operation time and operation hours of components constituting a cooling cycle.

FIG. 6 is a diagram expressing a control method for a refrigerator according to another exemplary embodiment of the present invention by an operation time and operation hours of components constituting a cooling cycle.

Referring to FIG. 6, when it is judged that the temperature of the fridge 111 is equal to or higher than the set temperature and thus, cooling is required, the compressor 20 is actuated and at the same time, the fridge valve is opened, and the ice-making chamber is actuated. Herein, the fridge fan 261 is not actuated even though the fridge valve is opened in order to rapidly lower the evaporation temperature and evaporation pressure of the fridge evaporator 26 by delaying the actuation time of the fridge fan 261. The up-to-now process is the same as that of the previous exemplary embodiment.

Meanwhile, the ice-making chamber fan is actuated in the fridge cooling mode in order to cool the ice-making chamber 15 by sending the residual cool air remaining in the freezer evaporator 24 to the ice-making chamber 15 and make the evaporation temperature and evaporation pressure of the freezer evaporator 24 be maximally close to the evaporation temperature and pressure of the fridge evaporator 26 by raising the evaporation temperature and pressure of the freezer evaporator 24. Therefore, during the fridge cooling process in which the refrigerants flow to the fridge evaporator 26, the time required to collect the refrigerants remaining in the freezer evaporator 24 is shortened and the refrigerants can be easily collected without an additional pump-down process. By summarizing a difference from the previous exemplary embodiment, they are different in that the residual cool air remaining in the freezer evaporator 24 is sent to the freezer and the ice-making chamber.

In particular, in the fridge cooling mode, by supplying the cool air to the ice-making chamber 15, a possibility that ice stored in the ice-making chamber will be coated decreases. Although described below, by supplying the residual cool air of the freezer evaporator 24 to the ice-making chamber 15, the internal temperature of the ice-making chamber is maintained to a sub-zero temperature at all times, such that the ice is not melted and coated. In addition, the cool air is supplied to the ice-making chamber by extensively actuating the ice-making chamber fan, such that the compress does not need to be actuated in order to cool the ice-making chamber. Accordingly, power consumption efficiency of the refrigerator can be improved. Actually, as a verification result through the tests, the power consumption efficiency is improved by approximately 3%.

Further, on the same purpose as the previous exemplary embodiment, the ice-making fan is actuated only for a set time te+tf and thereafter. stops. If the ice-making chamber fan is continuously actuated, the temperature of the supplied cool air is rather higher than the temperature of the ice-making chamber, such that the temperature of the ice-making chamber may increase. Herein, a time when the ice-making chamber fan is actuated in the fridge cooling mode may be a predetermined value determined through various tests and may be inputted as a predetermined time value into the control program. Alternatively, the operation time te+tf of the ice-making chamber fan may be a time value varying depending on the fridge valve opening time of the previous cycle. For example, ½ or ⅓ of the fridge valve opening time of the previous cycle is programmed to be determined as the operation time te+tf of the ice-making fan. As such, the actuation time may vary in accordance with an operation state or an operation condition.

Meanwhile, the actuation time of the fridge fan 261 may be a predetermined time when the set time te elapsed after the fridge valve is opened. That is, by making the actuation time of the fridge fan 261 be later than the opening time of the fridge valve, the evaporation pressure of the fridge evaporator is maximally lowered.

The actuation time of the fridge fan 261 may be as follows in accordance with the set time te.

First, while the ice-making fan is actuating, the fridge fan 261 may start actuating. That is, in the fridge cooling mode, a time period that the ice-making fan and the fridge fan 261 are actuated at the same time may exist.

Second, in the case of the actuation time of the fridge fan 261, the fridge fan 261 may start actuating at the time when the ice-making fan is actuated for the set time te+tf and thereafter, stops.

Third, at a predetermined time point that a predetermined time period elapses after the ice-making chamber fan stops actuating, the fridge fan 261 may controlled to be actuated. In other words, the time from the time when the fridge valve is opened to the time when the fridge fan 261 starts to be actuated may be longer than the actuation time of the ice-making chamber fan.

In addition, when the temperature of the fridge 111 is lowered to the set temperature, the fridge valve is closed and at the same time, the freezer valve is opened to start cooling the freezer. In addition, the compressor 20 is continuously actuated until the temperature of the freezer 114 is lowered to the set temperature. Further, when the temperature of the freezer 114 reaches the set temperature, the freezer valve is closed and the compressor 20 stops. Herein, even though the compressor 20 stops and the freezer valve is closed, the freezer fan 241 is further actuated for a set time ti and thereafter, stops. That is, a total actuation time of the freezer fan 241 is acquired by adding the set time ti to the opening time th of the freezer valve. This is to improve cooling efficiency through maximally lowering the temperature of the freezer by supplying the residual cool air remaining in the freezer evaporator 24 to the freezer without extinction as described above.

Herein, the extended operation time ti of the freezer fan 241 may also be a predetermined constant value determined by the tests. Alternatively, the time td may be a time value acquired from a function using as variables the temperature of the cool air introduced into the freezer evaporator 24, the temperature of the refrigerants remaining the freezer evaporator 24, and an air volume or an air velocity caused by the ice-making fan. For example, when the temperature of the cool air introduced into the freezer evaporator, the temperature of the refrigerants remaining in the freezer evaporator, an the air volume or wind velocity value caused by the ice-making fan while the compressor stops are inputted into the function, a time when the temperature of the residual cool air of the freezer evaporator 24 is higher than the internal temperature of the ice-making chamber is acquired to determine the extended operation time of the freezer fan 241.

Figure 7:
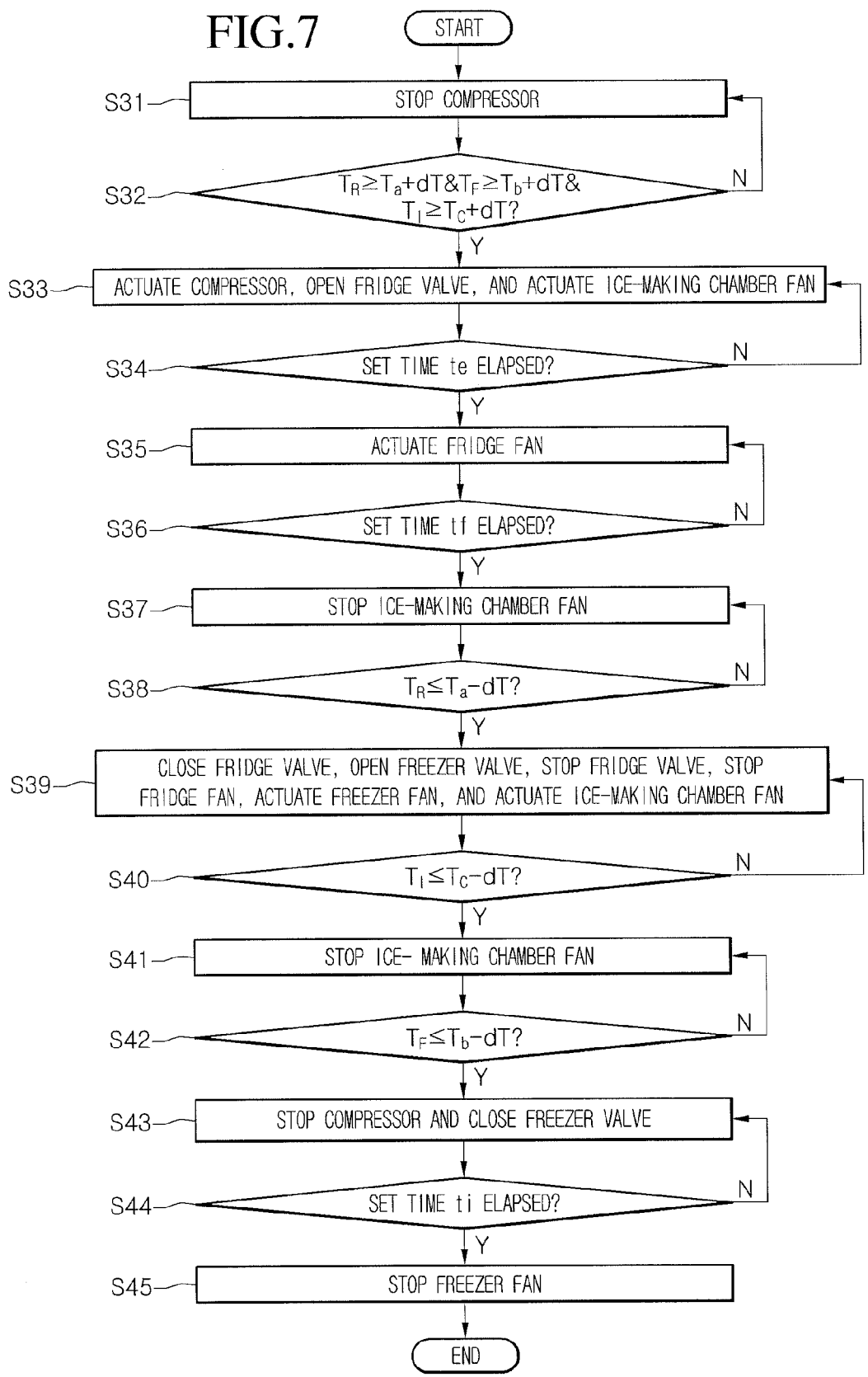
FIG. 7 is a flowchart illustrating a control method for a refrigerator according to an exemplary embodiment of the present invention.

FIG. 7 is a flowchart illustrating a control method for a refrigerator according to another exemplary embodiment of the present invention.

Referring to FIG. 7, this flowchart is to illustrate a content which the drawing shown in FIG. 6 means in a time series.

As set forth above in FIG. 6, the control method according to the exemplary embodiment of the present invention is limited to starting while the compressor 20 stops (S31).

Specifically, after the compressor 20 stops, when it is judged that the temperature $T_R$ of the fridge is equal to or higher than the set upperlimit temperature $T_a$+dT and the temperature $T_F$ of the freezer is also equal to or higher than the set upperlimit temperature $T_b$+dT (S32), the fridge cooling process is performed. That is, the compressor starts to be actuated, the fridge valve is opened, and the ice-making fan is actuated (S33). In the related art, loads of the ice-making chamber and the freezer increase continuously during the fridge cooling process. However, according to the exemplary embodiment, by supplying the cool air to the ice-making chamber for a predetermined time during the fridge cooling chamber, it is possible to prevent or minimize the ice stored in the ice-making chamber from being melted and coated.

In addition, as the actuation condition of the compressor 20, all the temperatures of the fridge, the freezer, and the ice-making chamber do not particularly need to increase to the set upperlimit temperatures. That is, when any one or at least two of the temperatures of the fridge, the freezer, and the ice-making chamber increase to the set upperlimit temperature or higher, the compressor may be programmed to be actuated. In addition, even when the internal temperature of the ice-making chamber is maintained within the set temperature range, the ice-making chamber may be cooled together by driving the ice-making chamber fan in the freezer cooling mode.

Meanwhile, when it is judged that the ice-making chamber starts to be actuated and the set time te elapsed (S34), the fridge fan 261 starts to be actuated (S35). In addition, the fridge fan 261 is actuated to supply the cool air to the fridge 111, thereby lowering the temperature of the fridge. In addition, when it is judged that the set time tf further elapsed from the actuation time of the fridge fan 261 (S36), the ice-making fan stops to be actuated (S37). As described above, of course, the actuation time of the fridge fan and the stop time of the ice-making chamber fan are not limited to the exemplary embodiment of the present invention. That is, a period when the fridge fan and the ice-making chamber fan are actuated at the same time may be provided or not provided.

Further, when it is judged that the temperature $T_R$ of the fridge 111 reaches the set temperature $T_a$–dT (S38), the fridge valve is closed, the freezer valve is opened, the freezer fan 241 is actuated, and at the same time, the ice-making fan is actuated (S39). That is, the freezer and ice-making chamber cooling processes start.

Further, when the freezer fan 241 is actuated to supply the cool air to the freezer 114 and the ice-making chamber 15, the temperatures of the freezer 114 and the ice-making chamber 15 are lowered. When the temperature of $T_1$ of the ice-making chamber reaches a set temperature $T_c$–dT (S40), the ice-making chamber fan stops to be actuated (S41). In addition, when the temperature $T_F$ of the freezer 114 reaches the set temperature Tb–dT (S42), the compressor 20 stops and the freezer valve is closed (S43). In this case, even though the compressor 20 stops, the freezer fan 241 is extensively actuated. In addition, when it is judged that the extensive actuation time of the freezer fan 241 elapses the set time ti (S44), the freezer fan 241 stops to be actuated (S45). Further, the stop time of the compressor may be earlier than the actuation time of the ice-making chamber fan. The reason for that is that the cooling time of the ice-making chamber is relatively shorter than the cooling time of the freezer and whether the compressor stops is determined whether or not to satisfy the temperature of the freezer.

Figure 8:
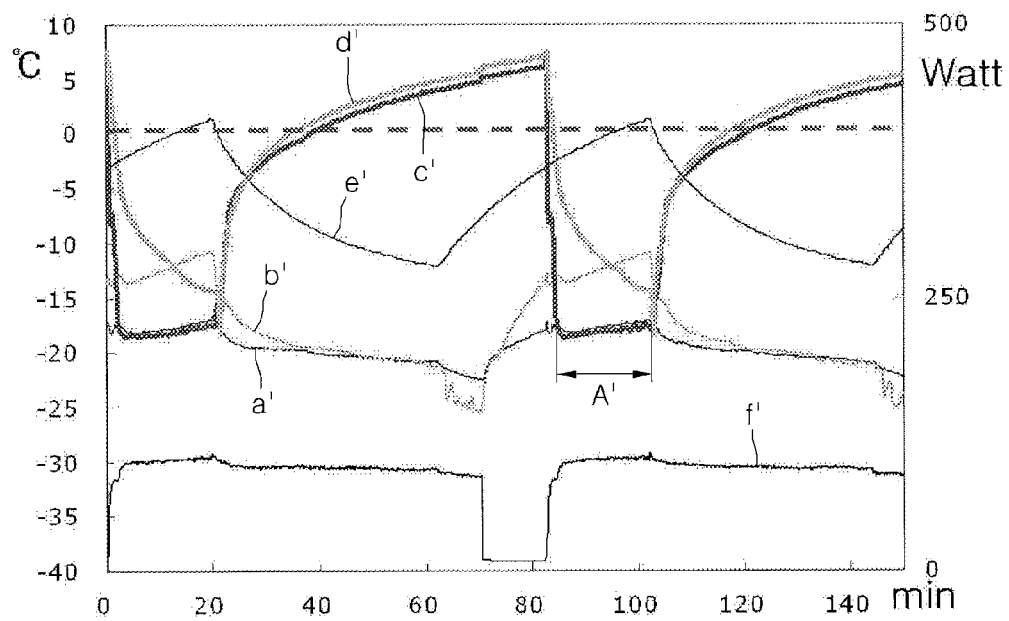
FIG. 8 is a graph illustrating a comparison in a refrigerant state between a case in which a pump-down process is merely omitted and a case in which the control method according to the exemplary embodiment of the present invention is applied.
Figure 8:
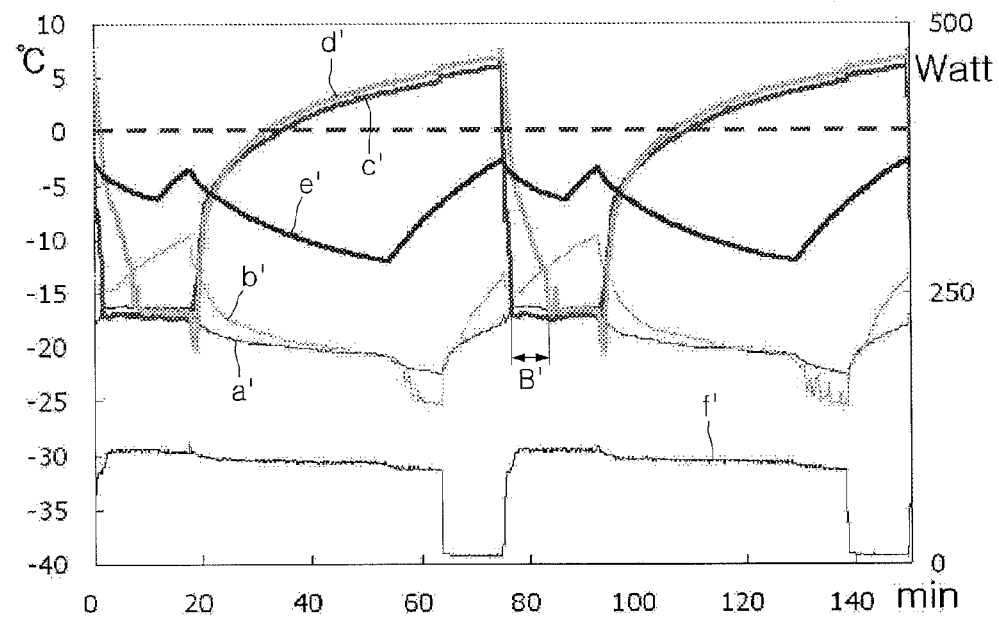

FIG. 8 is a graph illustrating a comparison in a refrigerant state between a case in which a pump-down process is merely omitted and a case in which the control method according to another exemplary embodiment of the present invention is applied.

Referring to FIG. 8, in the graph, a' is a graph illustrating variation in temperature at the inlet of the freezer evaporator, b' is a graph illustrating variation in temperature of the outlet of the freezer evaporator, c' is a graph illustrating variation in temperature of the inlet of the fridge evaporator, d' is a graph illustrating a temperature of the outlet of the fridge evaporator, e' is a graph illustrating variation in temperature of the ice-making chamber, and f' is a graph illustrating variation in input power of the compressor.

Further, the graph (a) of FIG. 8 illustrates a characteristic when the pump-down process is just removed from the existing cooling cycle and the graph (b) illustrates a characteristic when the control method according to another exemplary embodiment of the present invention is applied.

In the graphs (a) and (b), at an initial point when the compressor 20 starts to be actuated and the fridge cooling cycle starts, collection of the refrigerants starts and a point when an inlet temperature and an outlet temperature of the fridge evaporator are the same as each other is set as a collection termination time of the refrigerants.

By the control method according to another exemplary embodiment of the present invention, the refrigerant collection time may be shortened compared with the case in which the pump-down is removed through the two graphs. Specifically, period (A') of the graph (a) is a refrigerant collection time required when the pump-down process is deleted and period (B') of the graph (b) is a refrigerant collection time required when the control method according to another exemplary embodiment of the present invention is applied.

Accordingly, by the control method, an additional pump-down process for collecting the refrigerants becomes unnecessary, and as a result, the power consumption is reduced and the evaporation latent heat remaining the freezer evaporator 24 can be effectively used. Further, the refrigerant collection time is shortened (B'<A') compared with the case in which the pump-down process is just omitted.

In addition, referring to e', the temperature variation graph of the ice-making chamber shown in the graph (b), it can be verified that the upperlimit temperature of the ice-making chamber is positioned at a region below the freezing temperature. The reason for that is that the residual cool air remaining the freezer evaporator 24 is supplied to the ice-making chamber during the fridge cooling process. Therefore, it is possible to effectively prevent ice from being coated in the ice-making chamber.

Figure 9:
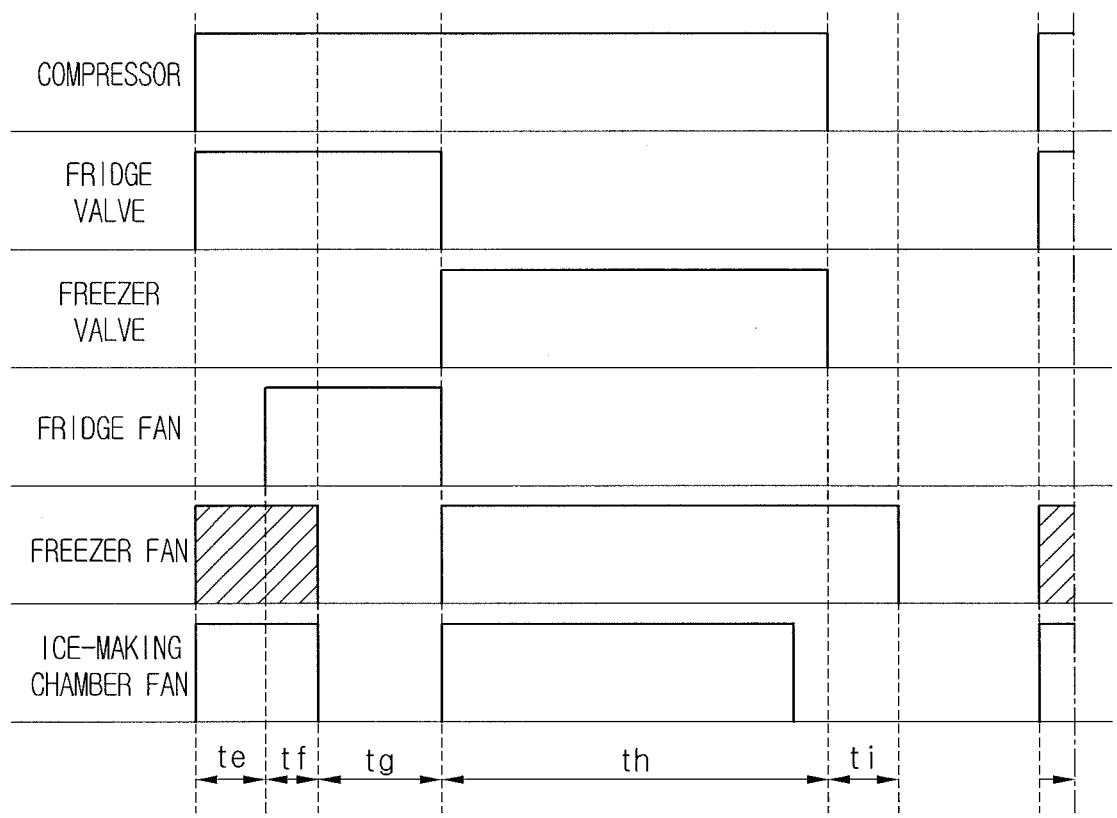
FIG. 9 is a diagram expressing a control method for a refrigerator according to another exemplary embodiment of the present invention by an operation time and operation hours of components constituting a cooling cycle.

FIG. 9 is a diagram expressing a control method for a refrigerator according to yet another exemplary embodiment of the present invention by an operation time and operation hours of components constituting a cooling cycle.

Referring to FIG. 9, the exemplary embodiment is substantially the same as the previous exemplary embodiments in the control method, however, they are different from each other in that the ice-making fan and the freezer fan are actuated simultaneously in the fridge cooling mode.

Specifically, in the fridge cooling mode, the residual cool air remaining the freezer evaporator 24 is supplied to even the freezer as well as the ice-making chamber. Therefore, compared with the case in which only the ice-making chamber is actuated, the evaporation temperature and pressure of the freezer evaporator 24 further increase. As a result, the evaporation temperature and pressure of the freezer evaporator 26 are closer to the evaporation temperature and pressure of the fridge evaporator 26, such that the refrigerants can be more easily collected.

Meanwhile, the freezer fan 241 may be stop before the ice-making chamber fan stops. For example, the actuation time of the freezer fan 241 and the actuation time of the ice-making chamber fan are the same as each other, however, the freezer fan 241 may stop at ½ or ⅓ of the actuation time of the ice-making chamber fan. However, the present invention is not limited to the exemplary embodiment, and the freezer fan may be actuated longer than the ice-making fan and may stop simultaneously. In short, the stop time of the freezer fan can be appropriately selected depending on the amount of the residual cool air of the freezer evaporator 24, i.e., the amount of the refrigerants and the temperature of the refrigerants.

What is claimed is:

1. A control method for a refrigerator including a compressor, a fridge evaporator and a freezer evaporator connected in parallel to an outlet of the compressor, and a valve member selectively opening and closing a refrigerant passage to allow refrigerants to flow to any one side of the fridge evaporator and the freezer evaporator, the method comprising:
    actuating the compressor;
    opening a refrigerant passage at the fridge evaporator by operating the valve member at the same time when or just after the compressor is actuated;
    determining an operation time of a freezer fan as a function of a fridge valve opening time of a previous cooling cycle;
    at the same time when or just after the refrigerant passage at the fridge evaporator is opened, controlling the freezer fan to actuate and operate for the determined operation time of the freezer fan; and
    actuating the fridge fan at a predetermined time after an opening time of the refrigerant passage at the fridge evaporator.

2. The control method for a refrigerator of claim 1, wherein the freezer fan stops at a predetermined time before the refrigerant passage at the fridge evaporator is closed.

3. The control method for a refrigerator of claim 2, wherein an actuation time of the fridge fan is any one of a moment when the freezer fan stops, a predetermined time before the freezer fan stops, and a time later than the moment when the freezer fan stops.

4. The control method for a refrigerator of claim 3, further comprising:
closing the refrigerant passage at the fridge evaporator as the temperature of the fridge reaches a set temperature;
stopping the fridge fan;
opening a refrigerant passage at the freezer evaporator; and
reactuating the freezer fan.

5. The control method for a refrigerator of claim 4, wherein the refrigerant passage at the freezer evaporator is opened at the same time when or just after the refrigerant passage at the fridge evaporator is closed.

6. The control method for a refrigerator of claim 4, further comprising:
stopping the compressor as the temperature of the freezer reaches the set temperature; and
closing the refrigerant passage at the freezer evaporator,
wherein the freezer fan is extensively actuated for a set time td after the compressor stops or the refrigerant passage at the freezer evaporator is closed and thereafter, stops.

7. A control method for a refrigerator including a compressor, a fridge evaporator and a freezer evaporator connected in parallel to an outlet of the compressor, an ice-making chamber positioned at a refrigerating chamber of the refrigerator, and a valve member selectively opening and closing a refrigerant passage to allow refrigerants to flow to any one side of the fridge evaporator and the freezer evaporator, the method comprising:
actuating the compressor;
opening a refrigerant passage at the fridge evaporator by operating the valve member at the same time when or just after the compressor is actuated;
at the same time when or just after the refrigerant passage at the fridge evaporator is opened, actuating an ice-making chamber fan that causes air cooled by the freezer evaporator to flow to the ice-making chamber positioned at the refrigerating chamber;
actuating the fridge fan at a predetermined time after an opening time of the refrigerant passage at the fridge evaporator that occurs during operation of the ice-making chamber fan; and
controlling the ice-making chamber fan to stop at a predetermined time after actuation of the fridge fan that occurs during operation of the fridge fan.

8. The control method for a refrigerator of claim 7, wherein the ice-making chamber fan is actuated only for a set time te+tf and thereafter, stops at a predetermined time before the refrigerant passage at the fridge evaporator is closed.

9. The control method for a refrigerator of claim 8, wherein the set time te+tf varies depending on an opening time of the refrigerant passage at the fridge evaporator of previous cooling cycle.

10. The control method for a refrigerator of claim 8, further comprising:
closing the refrigerant passage at the fridge evaporator as the temperature of the fridge reaches a set temperature;
stopping the fridge fan;
opening a refrigerant passage at the freezer evaporator;
actuating the freezer fan; and
reactuating the ice-making chamber fan.

11. The control method for a refrigerator of claim 10, wherein the refrigerant passage at the freezer evaporator is opened at the moment when or just after the refrigerant passage at the fridge evaporator is closed.

12. The control method for a refrigerator of claim 10, further comprising:
stopping the ice-making chamber fan as the temperature of the ice-making chamber reaches the set temperature; and
stopping the compressor and closing the refrigerant passage at the freezer evaporator as the temperature of the freezer reaches the set temperature,
wherein the freezer fan is extensively actuated for a set time te after the compressor stops or the refrigerant passage at the freezer evaporator is closed and thereafter, stops.

13. The control method for a refrigerator of claim 7, further comprising actuating the freezer fan at the same time when or just after the refrigerant passage at the fridge evaporator is opened.

14. The control method for a refrigerator of claim 13, wherein the actuation time of the freezer fan is the same as the actuation time of the ice-making chamber fan, and
the stopping time of the freezer fan is earlier than the stopping time of the ice-making chamber fan.

15. The control method for a refrigerator of claim 1, wherein determining the operation time of the freezer fan as a function of the fridge valve opening time of the previous cooling cycle comprises determining the operation time of the freezer fan as a fraction of the fridge valve opening time of the previous cooling cycle.

16. The control method for a refrigerator of claim 15, wherein determining the operation time of the freezer fan as a fraction of the fridge valve opening time of the previous cooling cycle comprises determining the operation time of the freezer fan as one-half of the fridge valve opening time of the previous cooling cycle.

17. The control method for a refrigerator of claim 15, wherein determining the operation time of the freezer fan as a fraction of the fridge valve opening time of the previous cooling cycle comprises determining the operation time of the freezer fan as one-third of the fridge valve opening time of the previous cooling cycle.

18. The control method for a refrigerator of claim 7, further comprising maintaining a freezer fan in an off state during operation of the ice-making chamber fan while the refrigerant passage at the fridge evaporator is opened.

19. The control method for a refrigerator of claim 7, wherein controlling the ice-making chamber fan to stop at a predetermined time after actuation of the fridge fan that occurs during operation of the fridge fan comprises:
determining an operation time of the ice-making chamber fan as a function of the fridge valve opening time of the previous cooling cycle; and
controlling the ice-making chamber fan to stop after the determined operation time has completed.

20. The control method for a refrigerator of claim 19, wherein determining the operation time of the ice-making chamber fan as a function of the fridge valve opening time of the previous cooling cycle comprises determining the operation time of the ice-making chamber fan as a fraction of the fridge valve opening time of the previous cooling cycle.

21. The control method for a refrigerator of claim 20, wherein determining the operation time of the ice-making chamber fan as a fraction of the fridge valve opening time of the previous cooling cycle comprises determining the operation time of the ice-making chamber fan as one-half of the fridge valve opening time of the previous cooling cycle.

22. The control method for a refrigerator of claim 20, wherein determining the operation time of the ice-making chamber fan as a fraction of the fridge valve opening time of the previous cooling cycle comprises determining the operation time of the ice-making chamber fan as one-third of the fridge valve opening time of the previous cooling cycle.

* * * * *